United States Patent [19]
Haerzschel et al.

[11] Patent Number: 5,296,532
[45] Date of Patent: Mar. 22, 1994

[54] ADHESIVE COMPOSITIONS CONTAINING AQUEOUS COPOLYMER DISPERSIONS AND ACID METAL SALTS OR FREE ACIDS

[75] Inventors: Reinhard Haerzschel; Rudolf Weissgerber; Herbert Kaiser; Wilhelm Kaiser, all of Burghausen, Fed. Rep. of Germany

[73] Assignee: Wacker-Chemie GmbH, Munich, Fed. Rep. of Germany

[21] Appl. No.: 837,553

[22] Filed: Feb. 14, 1992

Related U.S. Application Data

[63] Continuation of Ser. No. 626,953, Dec. 13, 1990, abandoned.

Foreign Application Priority Data

Dec. 22, 1989 [DE] Fed. Rep. of Germany ....... 3942628

[51] Int. Cl.$^5$ .................. C08K 5/09; C08L 29/04; C08G 63/91; C08F 6/00
[52] U.S. Cl. .................................. 524/398; 524/399; 524/459; 524/503; 524/803; 525/57; 525/64; 528/501; 528/502; 528/503
[58] Field of Search ............... 524/398, 399, 459, 503, 524/803; 525/57, 64; 528/501, 502

[56] References Cited

U.S. PATENT DOCUMENTS 4,118,357 10/1978 Brabetz et al. .................... 524/459

Primary Examiner—Paul R. Michl
Assistant Examiner—Tae H. Yoon
Attorney, Agent, or Firm—Burgess, Ryan & Wayne

[57] ABSTRACT

The invention relates to adhesive compositions for gluing wood containing aqueous vinyl ester graft copolymer dispersions and water-soluble acid metal salts or free acids, in which the adhesive compositions exhibit outstanding resistance to hot water and have high storage stability. The vinyl ester graft copolymer comprises from 2 to 12 percent by weight, based on the total weight of the graft copolymer, of one or more polyvinyl alcohols having a degree of hydrolysis of from 60 to 99 mol persent and 88 to 98 percent by weight, based on the total weight of the graft copolymer, of a grafting monomer mixture. The grafting monomer mixture contains from 5 to 50 percent by weight, based on the total weight of the monomer mixture, of vinyl esters of saturated, highly branched aliphatic monocarboxylic acids having 9 or 10 carbon atoms, vinyl pivalate, diisopropyl maleate, diisopropyl fumarate, vinyl chloride and mixtures thereof.

6 Claims, No Drawings

ADHESIVE COMPOSITIONS CONTAINING AQUEOUS COPOLYMER DISPERSIONS AND ACID METAL SALTS OR FREE ACIDS

This application is a continuation of application Ser. No. 626,953, filed Dec. 13, 1990, now abandoned.

The present invention relates to adhesive compositions containing aqueous vinyl ester graft copolymer dispersions and water-soluble acid metal salts or free acids which are resistant to hot water, and a process for the preparation of the aqueous vinyl ester graft copolymer dispersions.

BACKGROUND OF THE INVENTION

The use of aqueous polyvinyl ester dispersions as adhesives is known. One disadvantage of these dispersions is their low resistance to water due to the presence of protective colloids, such as, for example, polyvinyl alcohol. U.S. Pat. No. 4,118,357 (DE-A2,620,738) describes the use of polyvinyl ester dispersions in which the polyvinyl ester component is grafted onto polyvinyl alcohol and which contain water-soluble acids or water-soluble acid metal salts as a hardener additive, to improve their resistance to water. With the addition of water-soluble acids as hardeners, these dispersions have an acceptable storage stability, (pot lives of more than 4 weeks); however, their resistance to hot water is unsatisfactory in comparison with the addition of water-soluble metal salts as hardeners. If the above mentioned metal salts are employed as the hardener additive together with the vinyl ester graft copolymer dispersions, the resultant adhesives have outstanding resistance to hot water; however, the storage stability is drastically reduced (pot lives of significantly less than 4 weeks).

Therefore, it is an object of the present invention to provide adhesives containing aqueous vinyl ester graft copolymers which, when mixed with water-soluble metal salt hardeners, have a high resistance to hot water and high storage stability.

SUMMARY OF THE INVENTION

The foregoing objects and other which will become apparent from the following description are accomplished in accordance with this invention, generally speaking, by providing aqueous vinyl ester graft copolymer dispersions which contain water-soluble metal salts of monobasic acids having a $pK_a$ of less than 0 or free acids having a $pK_a$ of less than 0 as an adhesive which have a high resistance to hot water and a long pot life, in which the vinyl ester graft copolymer comprises:

I. 2 to 12 percent by weight, based on the total weight of the graft copolymer, of at least one polyvinyl alcohol having a degree of hydrolysis of from 60 to 99 mol percent; and II. 88 to 98 percent by weight, based on the total weight of the graft copolymer, of a monomer mixture containing:

(a) 5 to 50 percent by weight, based on the total weight of the monomer mixture, of at least one member selected from the group consisting of vinyl esters of saturated, highly branched aliphatic monocarboxylic acids having 9 or 10 carbon atoms, vinyl pivalate, diisopropyl maleate, diisopropyl fumarate, vinyl chloride and mixtures thereof;

(b) 50 to 95 percent by weight, based on the total weight of the monomer mixture, of vinyl esters other than (a), having 1 to 18 carbon atoms in the acid radical;

(c) 0.01 to 4 percent by weight, based on the total weight of the monomer mixture, of copolymerizable polyethylenically unsaturated monomers; and (d) 0 to 26 percent by weight, based on the total weight of the monomer mixture, of other copolymerizable mono-ethylenically unsaturated monomers.

The weights, of course, add up to 100 percent by weight in the graft copolymer.

DESCRIPTION OF THE INVENTION

Partially hydrolyzed polyvinyl alcohols having a degree of hydrolysis of from 60 to 99 mol percent, preferably from 75 to 95 mol percent, are suitable as the graft base I. The polyvinyl alcohols are employed in an amount of from 2 to 12 percent by weight, based on the total weight of the graft copolymer.

The graft monomer mixture II has a content of from 88 to 98 percent, based on the total weight of the graft copolymer. The grafting monomer mixture II contains, as component (a), 5 to 50 percent by weight, preferably from 10 to 30 percent by weight, based on the total weight of the monomer mixture, of at least one member selected from the group consisting of vinyl esters of saturated, highly branched aliphatic monocarboxylic acids having 9 or 10 carbon atoms, vinyl pivalate, diisopropyl maleate, diisopropyl fumarate, vinyl chloride or mixtures thereof.

Examples of vinyl esters of saturated, highly branched aliphatic monocarboxylic acids having 9 or 10 carbon atoms are the versatic acid vinyl ester mixtures VeoVa 9 and VeoVa 10 (commercial products of Shell Chemie GmbH) or individual constituents of these mixtures.

Vinyl esters of saturated aliphatic monocarboxylic acids having 9 carbon atoms which contain a quaternary carbon atom in the α-position relative to the carboxyl group are particularly preferred. The versatic acid vinyl esters VeoVa 9 (commercial product from Shell Chemie GmbH), which is a mixture of vinyl esters of highly branched monocarboxylic acids having 9 carbon atoms, or individual constituents of this mixture, may be mentioned in particular.

The grafting monomer mixture II contains, as component (b), 50 to 95 percent by weight, based on the total weight of the monomer mixture, of one or more vinyl esters other than component (a) having 1 to 18 carbon atoms in the acid radical. Examples of these are vinyl formate, vinyl acetate, vinyl propionate, vinyl 2-ethyl hexanoate, vinyl laurate and vinyl stearate.

The grafting monomer mixture II contains, as component (c), 0.01 to 4 percent by weight, based on the total weight of the monomer mixture, of poly-ethylenically unsaturated comonomers. Examples of these are decadiene, vinyl crotonate, diallyl phthalate, divinyl adipate, methylene bisacrylamide, triallyl cyanurate, butanediol diacrylate, hexanediol diacrylate, pentaerythritol triacrylate, trimethylolpropane triacrylate, divinyldimethylsilane, divinyltetramethyldisiloxane, triethylene glycol dimethacrylate, allyl acrylate and allyl methacrylate.

If appropriate, up to 26 percent by weight, based on the total weight of the monomer mixture, of other ethylenically unsaturated monomers can also be employed as component (d). Examples of these are acrylic or methacrylic acid and esters thereof with primary or secondary alcohols having 1 to 18 carbon atoms, such as, for example, methanol, ethanol, propanol, butanol and mixtures of short-chain alcohols and 2-ethylhexyl, cyclohexyl and lauryl alcohols; olefins, such as, for example, ethylene, propylene and butylene; vinyl halides and vinylidene halides, such as, for example, vinyl fluoride, vinylidene fluoride and vinylidene chloride; vinyl aromatics, such as styrene; $\alpha,\beta$-unsaturated monocarboxylic acids having a carbon chain of from 4 to 10 carbon atoms, such as, for example, crotonic and isocrotonic acid and esters thereof with primary or secondary alcohols having from 1 to 18 carbon atoms, and $\alpha,\beta$-unsaturated dicarboxylic acids having from 4 to 10 carbon atoms, such as, for example, maleic, fumaric and itaconic acid and mono- and diesters thereof with primary or secondary alcohols having from 1 to 18 carbon atoms, excluding those mentioned as component (a). Other examples are nitrogen-containing monoolefinically unsaturated monomers, such as, for example, acrylonitrile, acrylamide, methacrylamide, N-methylolacrylamide, N-methylolmethacrylamide, allyl N-methylolcarbamate, N-methylolalkyl ethers, Mannich bases or N-methylol esters of N-methylol(meth)acrylamide or allyl N-methylolcarbamate. If nitrogen-containing monoolefinically unsaturated monomers are used, the amount thereof should not exceed 10 percent by weight, and more preferably from 1 to 6 percent by weight, based on the total weight of the monomer mixture.

The aqueous vinyl ester graft copolymer dispersion of this invention is prepared at temperatures between 35° and 80° C. Organic peroxides or azo compounds, for example, tertbutyl hydroperoxide, are employed in an amount of from 0.1 to 3.0 percent by weight, based on the total weight of the grafting monomer mixture, for initiation of the polymerization. The organic peroxides or azo compounds are preferably employed in combination with suitable reducing agents. The amount of reducing agent is preferably from 0.05 to 3.0 percent by weight, based on the total weight of the grafting monomer mixture. Examples of suitable reducing agents are sodium formaldehyde sulfoxylate, sodium sulfite, sodium bisulfite and dithionite.

Anionic or nonionic emulsifiers can also be employed in an amount of from 0.1 to 1.0 percent by weight, based on the total weight of the monomer mixture, for influencing the viscosity. Examples of these emulsifiers are alkyl sulfates, alkylsulfonates, sulfosuccinates and polyoxyethylene ethers of fatty alcohols.

In the polymerization, the polyvinyl alcohol is initially introduced into the reaction vessel in an aqueous suspension, if appropriate together with the emulsifier, and the remaining constituents of the reaction mixture are metered in individually or as a mixture. Preferably, the polyvinyl alcohol content is initially introduced in aqueous suspension and the comonomer components (a), (b), (c) and (d) are initially introduced partly as a mixture and partly metered in, and, if component (d) is a water-soluble comonomer, it is metered in separately.

The polymer dispersions to be used according to this invention have a solids content of from 40 to 60 percent by weight.

The graft copolymer dispersions thus prepared can also be spray-dried or freeze-dried, if appropriate, with the addition of an atomizing aid, an antifoaming agent and/or an antiblocking agent. The dispersion powders thus obtained are then redispersed in water for use as adhesives, in which the above mentioned solids content are employed. The precise procedure for dispersing these powders is familiar to those skilled in the art.

To increase the resistance of the adhesives to water, 0.5 to 10 percent by weight, based on the weight of the graft copolymer dispersion, of water-soluble metal salts of monobasic acids having a $pK_a$ of less than 0 is also added to the vinyl ester graft copolymer dispersion. Salts of Al(III), Fe(III) and/or Zr(IV); for example, aluminum nitrate, iron chloride and zirconium oxychloride, are particularly preferred.

Free acids having a $pK_a$ of less than 0 can also be employed as hardeners. Examples of these are hydrochloric acid, nitric acid, perchloric acid, phosphoric acid and mixtures thereof. The acids are employed in 5 normal aqueous solution in an amount of from 0.5 to 10 percent by weight, based on the weight of the graft copolymer dispersion.

The adhesive of this invention can also contain film-forming agents or plasticizers as additional additives.

Adhesives specifically for gluing wood which are distinguished above all by a high resistance to hot water and are classified into stress group B 4/13 in accordance with DIN 68602 are obtained by the copolymerization of the comonomer component (a) in the vinyl ester graft copolymers. This resistance to hot water cannot be achieved even by incorporating of a large amount of crosslinking comonomers, for example, N-methylol acrylamide. Rather, the incorporation of such large amounts of reactive comonomers leads to a drastic reduction in the pot life of the adhesive dispersions. In contrast, the adhesives of this invention have exceptionally long pot lives of more than 2 months even with added acid metal salt hardeners.

The adhesives according to this invention are particularly suitable for gluing wood in interior rooms which are subject to extreme variations in climate and the action of water, for example, in indoor swimming pools or shower cubicles, and for external use where the climatic influences are great, for example, windows, exterior doors, ladders and stairs.

The invention is further illustrated by the following examples.

EXAMPLE 1

Six parts by weight of a partially hydrolyzed polyvinyl alcohol having a degree of hydrolysis of 90 mol percent and 70 parts by weight of water are initially introduced into a reactor equipped with a reflux condenser, stirrer, metering in possibilities, nitrogen inlet and heating and cooling possibilities. After the reactor has been flushed with nitrogen, 25 percent by weight of a monomer solution consisting of 80 parts by weight of vinyl acetate, 19.9 parts by weight of VeoVa 9 (commercial product from Shell Chemie GmbH), 0.05 part by weight of triallyl cyanurate and 0.1 part by weight of t-butyl hydroperoxide are added to the initial mixture and the reaction mixture is heated. Metering of the initiator feed, consisting of 7 parts by weight of water, 0.15 part by weight of sodium formaldehyde sulfoxylate and 0.15 part by weight of sodium bicarbonate is started at about 55° C. Metering of the monomer is started at 65° C., one monomer metering consisting of the remainder of the monomer solution mentioned above and the second monomer metering consisting of 2 parts by weight of N-methylol acrylamide and 10 parts of water.

The initiator feed runs for 1 hour longer than the monomer metering. The polymerization is carried out at 65°-70° C., the rate of the monomer feeds being regulated so that no reflux occurs. When all the meterings have been completed, polymerization is carried out at 70° C. for an additional hour. An approximately 50 percent coagulate-free dispersion having a viscosity of about 15,000 mPas (Brookfield 20 revolutions per minute, 23° C.) is obtained. The dispersion is modified with about 3 percent of butyldiglycol acetate to reduce the minimum film-forming temperature.

EXAMPLES 2 TO 4 AND COMPARISON EXAMPLES A TO E

The dispersions in Examples 2 to 4 and Comparison Examples A to E were prepared by a process similar to the process of Example 1. In Example 3, a pressure polymerization is carried out by forcing in the corresponding amounts of ethylene and the vinyl chloride content being metered in together with the vinyl ester. The composition of the polymer and the solids content of the dispersions are described in Table 1 and Table 2.

To prepare the adhesives, the dispersions were mixed with the types and amounts of hardeners shown in Tables 1 and 2.

The adhesive strength was tested in accordance with DIN 68602 in combination with DIN 53254.

The test specimens were prepared in accordance with DIN 53254. In each case, two sheets of beech wood, each 5 mm thick, 130 mm wide and 150 mm long were glued with the adhesive dispersion to be tested.

Classification into stress group B 3/5 (resistance to cold water) in accordance with DIN 68602, requires that the glued test specimens be stored in a normal climate (20° C., 65 percent atmospheric humidity) for 7 days and then in cold water at 20° C. for 4 days (DIN 53254).

After storage, the adhesive strength was determined in a shear test, the glued plates being displaced relative to one another and loaded to the breaking point in a tensile tester at a drawing speed of 50 mm/minute. The maximum force $F_{Max}$ which occurs at the breaking point was determined. The tensile strength $\tau_a$ is calculated in accordance with DIN 53254 from $\tau_a = F_{Max}/A$, in which A is the test area glued in mm². Classification into stress group B 3/5 requires a tensile strength $\tau_a$ of $\geq 2 N/mm^2$ (DIN 68602).

Classification into stress group B 4/13 (resistance to hot water) in accordance with DIN 68602, requires that the test specimens be prepared in a procedure similar to the above; except that after the sheets of wood have been glued, the test specimens are stored in a normal climate (20° C., 65 percent atmospheric humidity) for 7 days, and then stored in boiling water for 6 hours and finally in cold water at 20° C. for 2 hours. The tensile strength $\tau_a$ was determined as above in accordance with DIN 53254.

Classification into stress group B 4/13 requires a tensile strength $\tau_a$ of $\geq 4 N/mm^2$ (DIN 68602).

The composition of the polymer and solids content of the dispersions of adhesive, hardener additive and resistance to cold water, resistance to hot water and pot life are listed in Tables 1 and 2.

Table 1 contains the data of the adhesives of this invention. Table 2 contains the data of adhesives which do not correspond to the adhesives of this invention.

Comparison of the adhesives according to the invention from Table 1 with the comparison examples in Table 2 shows how important the copolymerization of the comonomer component (a) is in order to achieve a high resistance to hot water, in accordance with stress group B 4/13 (DIN 68602), and in order to achieve long pot lives.

Copolymerization with any vinyl esters, such as, for example, vinyl laurate (Comparison Example B), leads to adhesives which do not have a satisfactory resistance to hot water.

Copolymerization with cross-linking comonomers alone such as, for example, N-methylolacrylamide (Comparison Example A) or divinyl adipate (Comparison Example C) cannot guarantee the required resistance to hot water and in particular the required storage stability.

TABLE 1

| | Example | | | | | |
|---|---|---|---|---|---|---|
| | 1 | 2 | 3 | 4 | 5 | 6 |
| Polymer composition (percent by weight) | | | | | | |
| Vinyl acetate | 73.94 | 73.94 | 36.46 | 69.64 | 69.11 | 74.28 |
| VeoVa 9 | 18.48 | 18.48 | — | — | — | — |
| VeoVa 10 | — | — | — | — | — | 18.57 |
| Vinyl pivalate | — | — | — | 23.21 | — | — |
| Vinyl chloride | — | — | 45.58 | — | — | — |
| Ethylene | — | — | 9.12 | — | — | — |
| Vinyl laurate | — | — | — | — | — | — |
| Diisopropyl maleate | — | — | — | — | 23.04 | — |
| Divinyl adipate | — | — | 0.18 | 0.19 | — | 0.19 |
| Triallyl cyanurate | 0.03 | 0.03 | — | — | 0.03 | — |
| N-Methylolacrylamide | 1.85 | 1.85 | 3.19 | 1.39 | 2.30 | 2.79 |
| Polyvinyl alcohol | 5.55 | 5.55 | 5.47 | 5.57 | 5.53 | 4.18 |
| Solids content (percent by weight) | 50 | 50 | 50 | 50 | 50 | 50 |
| Hardener (percent by weight of the dispersion) | | | | | | |
| AlCl₃ | 5.00 | — | 5.00 | 5.00 | 5.00 | 5.00 |
| H₃PO₄ | — | 5.00 | — | — | — | — |
| Adhesive strength | | | | | | |
| B 3/5 (N/mm²) | 4.30 | 4.10 | 4.60 | 4.70 | 4.00 | 4.40 |
| B 4/13 (N/mm²) | 4.50 | 4.10 | 4.40 | 4.40 | 4.20 | 4.30 |
| Pot life (months) | >2 | >2 | ca. 2 | >2 | >2 | >2 |

TABLE 2

| | Comparison Example | | |
|---|---|---|---|
| | A | B | C |
| Polymer composition (percent by weight) | | | |
| Vinyl acetate | 88.08 | 68.79 | 91.49 |
| VeoVa 9 | — | — | — |
| VeoVa 10 | — | — | — |
| Vinyl pivalate | — | — | — |
| Vinyl chloride | — | — | — |
| Ethylene | — | — | — |
| Vinyl laurate | — | 22.93 | — |
| Diisopropyl maleate | — | — | — |
| Divinyl adipate | — | — | 0.27 |
| Triallyl cyanurate | 0.03 | 0.03 | — |
| N-Methylolacrylamide | 6.61 | 2.75 | 4.57 |
| Polyvinyl alcohol | 5.28 | 5.50 | 3.66 |
| Solids content (percent by weight) | 50 | 50 | 50 |
| Hardener | | | |

TABLE 2-continued

| | Comparison Example | | |
|---|---|---|---|
| | A | B | C |
| (percent by weight of the dispersion) | | | |
| $AlCl_3$ | 5.00 | 5.00 | 5.00 |
| $H_3PO_4$ | — | — | — |
| Adhesive strength | | | |
| B 3/5 (N/mm$^2$) | 6.00 | 2.70 | 5.00 |
| B 4/13 (N/mm$^2$) | 2.40 | 2.50 | 2.70 |
| Pot life (months) | <2 | ca. 2 | <2 |

What is claimed is.

1. An adhesive composition having a high resistance to hot water and a long pot life comprising an aqueous vinyl ester graft copolymer dispersion, a water-soluble metal salt of a monobasic acid having a $pK_a$ of less than 0, in which the vinyl ester graft copolymer comprises:
   I. 2 to 12% by weight, based on the total weight of the graft copolymer, of at least one polyvinyl alcohol having a degree of hydrolysis of from 60 to 99 mole percent; and
   II. 88 to 98% by weight, based on the total weight of the graft copolymer, of a monomer mixer containing:
      (a) 5 to 50% by weight, based on the total weight of the monomer mixture, of vinyl esters of saturated, highly branched aliphatic monocarboxylic acids having 9 or 10 carbon atoms, vinyl pivalate, diisopropyl maleate, diisopropyl fumarate, vinyl chloride and mixtures thereof;
      (b) 50 to 95% by weight, based on the total weight of the monomer mixture, of vinyl esters other than (a) having 1 to 18 carbon atoms in the acid radical;
      (c) 0.01 to 4% by weight, based on the total weight of the monomer mixture, of copolymerizable polyethylenically unsaturated monomers; and
      (d) 0 to 26% by weight, based on the total weight of the monomer mixture, of other copolymerizable mono-ethylenically unsaturated monomers.

2. The adhesive of claim 1, wherein the water-soluble metal salt of a monobasic acid having a $pK_a$ of less than 0 is selected from the group consisting of Al(III), Fe(III), Zr(IV) and mixtures thereof.

3. The adhesive of claim 1, wherein the water-soluble metal salt of a monobasic acid is present in an amount of from 0.5 to 10 percent by weight, based on the weight of the vinyl ester graft copolymer dispersion.

4. A process for preparing the vinyl ester graft copolymer dispersion, which comprises introducing said polyvinyl alcohol into a reaction vessel in aqueous suspension and initially introducing part of the comonomer components (a), (b), (c) and (d) as a mixture and partially metering in the comonomer components, with the proviso that if component (d) is a water-soluble comonomer, then it is metered in separately, adding a redox catalyst system as initiator which consists of 0.1 to 3.0 percent by weight of organic peroxide or azo compound and 0.05 to 3.0 percent by weight of reducing agent, and then conducting the polymerization at 35° to 80° C.

5. The process of claim 4 wherein the graft copolymer dispersion is spray-dried or freeze-dried to produce a dispersion powder and the dispersion powder is redispersed in water.

6. The process of claim 5 wherein the step of spray-drying or freeze-drying is conducted in the presence of an atomizing aid, an antifoaming agent, an antiblocking agent and mixtures thereof.

* * * * *